(No Model.)
W. T. MELLON & J. A. BEST.
ANIMAL TRAP.
No. 443,970. Patented Dec. 30, 1890.
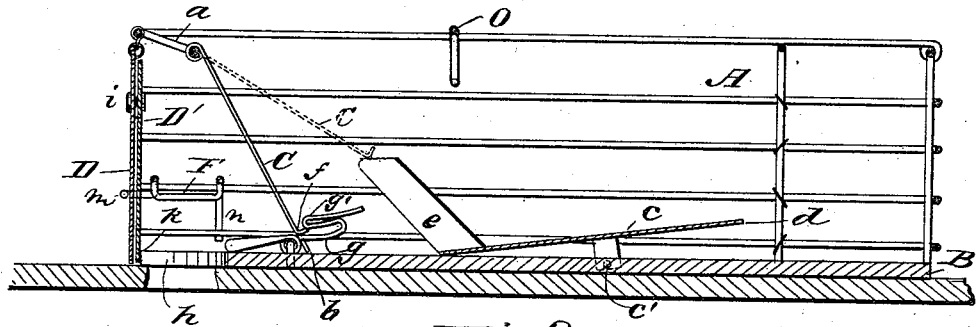
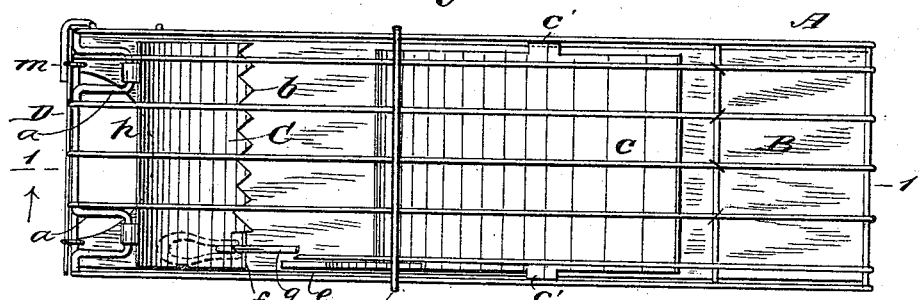
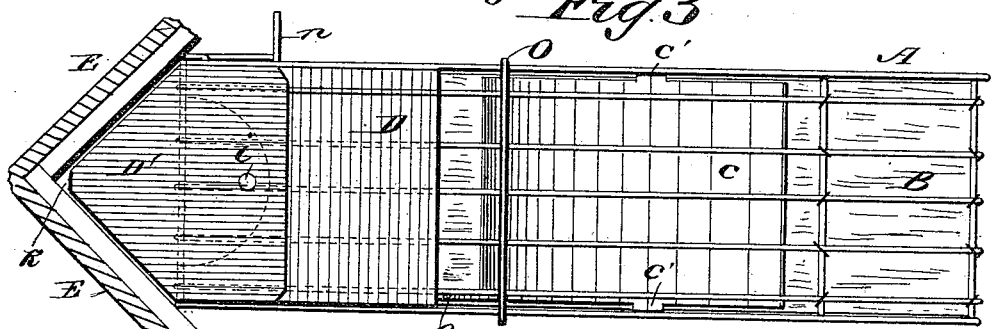
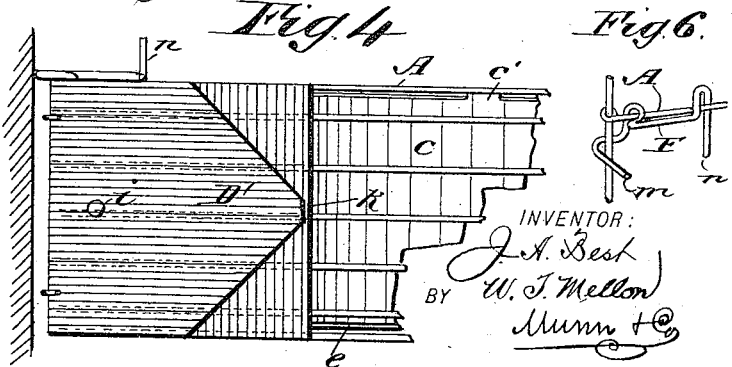
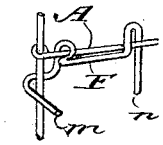
WITNESSES:
F. McArdle.
C. Sedgwick
INVENTOR:
J. A. Best
W. T. Mellon
BY Munn & Co.
ATTORNEYS

UNITED STATES PATENT OFFICE.

WILLIAM T. MELLON AND JOHN A. BEST, OF ATLANTIC CITY, NEW JERSEY.

ANIMAL-TRAP.

SPECIFICATION forming part of Letters Patent No. 443,970, dated December 30, 1890.

Application filed June 26, 1890. Serial No. 356,793. (No model.)

*To all whom it may concern:*

Be it known that we, WILLIAM T. MELLON and JOHN A. BEST, of Atlantic City, in the county of Atlantic and State of New Jersey, have invented a new and useful Animal-Trap, of which the following is a full, clear, and exact description.

This invention relates to an improvement in animal-traps, and particularly to such as are used to capture vermin of the rodent species, the object being to produce a simple and inexpensive trap which will be automatic in its action and that may be used without a bait.

To these ends our invention consists in the provision of means whereby the trap may be set to cover the exit-passage provided by the vermin, so that they will be captured when one or more make effort to traverse the passage.

Our invention further consists in certain features of construction and combinations of parts, as hereinafter described and claimed.

Reference is to be made to the accompanying drawings, forming a portion of this specification, in which similar letters of reference indicate corresponding parts in all the figures.

Figure 1 is a side elevation of the trap in section, taken on the line 1 1 in Fig. 2, the parts being shown in closed adjustment in full lines and the wicket set in open adjustment in dotted lines. Fig. 2 is a plan view of the trap with the wicket closed and locked. Fig. 3 is a plan view of the device adjusted to cover a mouse-hole in a corner of a room. Fig. 4 is a plan view of the forward portion of the trap set to cover a hole in a vertical wall or partition in a room. Fig. 5 is a detached perspective view of a gravity-latch employed to automatically lock the wicket in closed adjustment, and Fig. 6 is a detached view of a wire turn-buckle lock for the end gate of the trap.

The cage portion of the trap is comprised of a wire frame A, made up of a series of wire rods secured in parallel order at spaced intervals, so as to produce a rectangular compartment which is of proper dimensions proportioned to the size of the animal to be trapped.

The cage-frame A is secured upon a base-board, which may be of wood alone or faced with sheet metal to prevent gnawing action of rats or gophers if the trap is used to capture such vermin. Ordinarily the base-board B of wooden material will suffice to retain a caged mouse within the trap.

Within the cage A the wicket C is hinge-jointed to inwardly-projecting wire loops $a$, which hold the upper edge of the wicket near to the top of the cage at its forward end. Said wicket is preferably made of plate metal, which will afford weight, and thus insure its quick operation by gravity, and also prevent its destruction by the teeth of a caged rodent. The length of the wicket C is proportioned to the height of the cage, so that the wicket will lie inwardly inclined, as shown by full lines in Fig. 1, when the trap is closed.

At a suitable distance from the serrated lower edge $b$ of the closed wicket C, within the cage A, there is a tilting platform $c$, which is supported to rock longitudinally upon the base-board B by the pivotal engagement therewith of depending ears $c'$, that are oppositely formed on the side edges of the platform at such a distance from the forward edge of the same that the portion of the platform in front of the pivot-points at $c'$ will slightly overbalance the rear portion and hold the rear edge $d$ normally elevated. Upon one side of the platform at the forward edge a trigger-post $e$ is formed or secured, which is so relatively located that the lower edge of the wicket C will rest on it when "set" or properly adjusted, the height of the post being sufficient to permit the entering animal to pass freely below the lower edge of the wicket.

On the portion of the lower edge of the wicket C that is adjacent to one side of the cage A a latch-lip $f$ is formed, and in alignment with this lip a gravity latch-dog $g$ is pivotally supported from the base-board B of the trap, so that a latching-connection of the lip $f$ with the dog $g$ will take place when the wicket C is caused to fall.

As shown in Figs. 1, 2, and 5, the latch-dog $g$ is preferably formed of a single piece of wire so bent as to provide a latch-hook thereon at $g'$ and pivot-loops at $g^2$, whereby it may be affixed to the board B by a staple, and thus be adapted to lock the wicket closed when an animal is caged.

The rear end of the cage A is closed by cross-wires spaced to suit the side wires of the cage-frame, and at the front end a pendent gate D is hinged by its upper edge to the forward top edge of the cage-frame, so that its own weight will close it. Between the pendent end gate D and the wicket C an aperture $h$ is cut in the base-board B for the passage of a rodent into the trap, said hole being available to form a continuation of an exit-passage formed by the animal in a horizontal surface, which may be a floor of wood, bricks, or earth, or the ground surface in a field if gophers are to be trapped.

Upon the upper side of the hinged gate D or side of the same which assumes that position when the gate is folded upon the top of the cage A an extension-plate D' is pivoted, as at $i$ in Figs. 3 and 4. The pivot $i$ is located at the transverse center of the gate D and the extension-plate D' and at such a point, longitudinally considered, as will permit a suitable portion of the extension-plate D' to project beyond the forward end of the trap when the plate is properly adjusted and the gate D folded over to lie upon the top surface of the cage A.

The part of the extension-plate D' which projects in advance of the trap proper is cut to slope its edges and form a right-angle corner $k$, that will align with the transverse center of the cage A when properly adjusted, and, as represented in Fig. 3, will fill a corner produced at the junction of two vertical walls E, if the device is set closely thereto, thus adapting the trap to surround a mouse-hole at the corner of a room and catch a mouse issuing therefrom.

When the trap is to be set to encompass with its front open end a mouse or rat hole in the vertical wall of a building, the extension-piece D' is revolved on its pivot $i$, so as to present the opposite straight edge of the extension-piece forwardly, which edge, being made to align with the adjacent hinged edge of the gate D, will permit the end of the trap to be placed closely against the wall of the apartment, and thus cause the open front end of the cage A to encompass the exit-hole of the rodent.

A turn-buckle lock F is shown, which is bent from a single piece of wire and is loosely secured to the side of the cage-frame, so that the limb $m$ of the turn-buckle may be projected in front of the lowered end gate D and secure it from outward movement when the opposite limb $n$ of the turn-buckle is depressed, thus securing the end gate in lowered adjustment when the trap is set over a mouse or rat hole, as shown in Fig. 1.

In case there is no exit-passage to utilize for the capture of vermin that may infest premises the trap may be baited.

In operation, the wicket C being set, as shown in Fig. 1 by dotted lines, the entrance of a rodent within the cage A will tip the platform $c$ and dislodge the wicket C from the post $e$ by the upward and rearward movement of the latter, which will permit the wicket to fall by gravity and engage with the latch-dog $g$, as previously explained. When an animal has been caught, the trap may be carried by the handle O to any place desired for killing the rodent, said handle being secured across the top of the cage-frame and connected to the side bars of the cage, so as to slide upwardly a short distance, and thus afford a finger-hold.

Having thus described our invention, we claim as new, and desire to secure by Letters Patent—

1. The combination, with a cage, of a tilting platform having a trigger-post thereon, a pendent wicket within the cage, and a latch-dog which is adapted to lock fast to the wicket when it falls from the trigger-post, substantially as set forth.

2. The combination, with an elongated cage, a tipping platform within, and a trigger-post thereon which is adapted to support a pendent wicket by a loose engagement with its lower edge, of a wicket having a serrated lower edge and a latch-lip thereon, a rocking gravity-actuated latch-dog that may engage the latch-lip on the wicket, and a pendent hinged end gate, substantially as set forth.

3. The combination, with a cage that is elongated, rectangular, and made of wire strands secured on a base-board that is apertured near its front end, a tilting platform supported pivotally from the base-board, and a trigger-post on the side edge of the tilting platform near its front end, of an inwardly and downwardly inclined wicket having its lower edge serrated and provided with a latch-lip and its upper edge hinged to the top of the cage-frame, a gravity-actuated rocking latch-dog that will engage the latch-lip of the wicket when the wicket falls, and a hinged end gate, substantially as set forth.

4. The combination, with an elongated rectangular cage open at one end, and an end gate hinged to close this open end by its gravity and be folded to lie on the cage-frame, of an extension-plate pivoted to the end gate, having one end portion cut into angular form, substantially as set forth.

5. The combination, with a wire cage that is rectangular and elongated, a tipping platform within, a trigger-post on the front end of the platform, which is adapted to engage the lower edge of a pendent wicket so as to hold the wicket up and the front end of the platform depressed when the trap is set, and a wicket that is hinged by its upper edge to the front top portion of the cage-frame and lies inwardly at an angle, having its lower edge serrated and provided with a latch-lip, of a gravity-actuated latch-dog which will lock fast to the latch-lip when the wicket falls, a hinged pendent end gate, and a turn-buckle latch therefor, substantially as set forth.

WILLIAM T. MELLON.
JOHN A. BEST.

Witnesses:
WM. E. LANE,
WM. H. HAVENS.